United States Patent
Cha

(10) Patent No.: US 9,604,516 B2
(45) Date of Patent: Mar. 28, 2017

(54) SUSPENSION SYSTEM FOR VEHICLE

(71) Applicant: Hyundai Mobis Co., Ltd., Seoul (KR)

(72) Inventor: Seung Hwan Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/921,646

(22) Filed: Oct. 23, 2015

(65) Prior Publication Data

US 2016/0121674 A1   May 5, 2016

(30) Foreign Application Priority Data

Oct. 30, 2014   (KR) .................. 10-2014-0149623

(51) Int. Cl.
*B60G 11/16*   (2006.01)

(52) U.S. Cl.
CPC .......... *B60G 11/16* (2013.01); *B60G 2202/12* (2013.01); *B60G 2204/1244* (2013.01); *B60G 2204/41* (2013.01); *B60G 2204/44* (2013.01); *B60G 2206/7104* (2013.01); *B60G 2206/73* (2013.01); *B60G 2206/81* (2013.01)

(58) Field of Classification Search
CPC ................ B60G 11/16; B60G 2204/1244
See application file for complete search history.

(56) References Cited

U.S. PATENT DOCUMENTS

| | | | | |
|---|---|---|---|---|
| 2,817,510 A * | 12/1957 | Hoban | ............. | B60G 7/04 16/86 A |
| 3,051,469 A * | 8/1962 | Boschi | ............. | B60G 11/16 267/248 |
| 5,421,565 A * | 6/1995 | Harkrader | ............. | B60G 11/16 267/153 |
| 6,149,171 A * | 11/2000 | Bono | ............. | F16F 1/126 280/124.179 |
| 6,254,072 B1 * | 7/2001 | Bono | ............. | F16F 1/126 267/220 |
| 6,857,626 B2 * | 2/2005 | Burlage | ............. | F16F 1/3605 267/153 |
| 7,416,175 B2 * | 8/2008 | Al-Dahhan | ............. | B60G 11/15 267/140 |
| 8,061,690 B2 * | 11/2011 | Desprez | ............. | F16F 1/126 267/152 |
| 8,414,004 B2 * | 4/2013 | Onda | ............. | B60G 11/16 267/140.4 |
| 2002/0109328 A1 * | 8/2002 | Remmert | ............. | B60G 11/16 280/124.147 |

(Continued)

FOREIGN PATENT DOCUMENTS

| | | | | |
|---|---|---|---|---|
| DE | 19758008 A1 * | 7/1998 | ............. | B60G 11/16 |
| DE | 102005011408 A1 * | 9/2006 | ............. | B60G 11/16 |

(Continued)

*Primary Examiner* — Ruth Ilan
(74) *Attorney, Agent, or Firm* — H.C. Park & Associates, PLC

(57) ABSTRACT

A suspension system for a vehicle that is capable of preventing a lower pad from being separated from a lower arm by elastic force of a spring. The lower pad of the suspension system for a vehicle includes an elastically deformable part made of a material deformable by elastic force of the spring, and a base part made of a material harder than the material of the elastically deformable part, and coupled to the lower arm.

9 Claims, 4 Drawing Sheets

(56) References Cited

U.S. PATENT DOCUMENTS

| | | | | |
|---|---|---|---|---|
| 2003/0098448 | A1* | 5/2003 | Horst | B25B 27/304 254/10.5 |
| 2007/0013161 | A1* | 1/2007 | Rhein | B60G 11/14 280/124.162 |
| 2009/0134596 | A1* | 5/2009 | Takahashi | B60G 7/001 280/124.179 |
| 2012/0292876 | A1* | 11/2012 | Koide | B60G 11/16 280/124.179 |

FOREIGN PATENT DOCUMENTS

| | | | | | |
|---|---|---|---|---|---|
| DE | 102007050084 | A1 | * | 4/2009 | ............ B60G 11/16 |
| DE | EP 2466167 | A2 | * | 6/2012 | ............ B06G 11/15 |
| DE | 102012213905 | A1 | * | 5/2014 | ............ B60G 11/16 |
| DE | 102013009637 | A1 | * | 12/2014 | ............ B60G 11/16 |
| EP | 0182607 | A2 | * | 5/1986 | ............ B60G 11/16 |
| EP | 0778166 | A2 | * | 6/1997 | ............ B60G 11/16 |
| FR | 3002996 | A1 | * | 9/2014 | ............ B60G 11/16 |
| JP | 2010007772 | A | * | 1/2010 | |

* cited by examiner

SUSPENSION SYSTEM FOR VEHICLE

CROSS-REFERENCE TO RELATED APPLICATION

The application claims priority from and the benefit of Korean Patent Application No. 10-2014-0149623, filed on Oct. 30, 2014, which is hereby incorporated by reference for all purposes as if fully set forth herein.

BACKGROUND

Field

An exemplary embodiment of the present invention relates to a suspension system for a vehicle, and more particularly, to a suspension system for a vehicle, which absorbs vibration that may be transmitted from a rear wheel to a vehicle body of the vehicle.

Discussion of the Background

In general, a suspension system for a vehicle connects an axle and a vehicle body (chassis) and prevents vibration or impact, which is transmitted from a road surface via wheels of the vehicle when the vehicle travels, from being transmitted directly to the vehicle body through the axle, thereby preventing damage to the vehicle body and/or freight being carried therein, and improving ride comfort.

A suspension system for a vehicle may be broadly classified into a front suspension system and a rear suspension system. A multi-link rear suspension system, which has three to five links installed in accordance with the type of vehicle, is sometimes utilized as a rear suspension system.

The multi-link rear suspension system includes a lower arm which is connected with the link, and a spring which supports a load of the vehicle body and is supported by the lower arm. Further, a lower pad made of a rubber material is installed on the lower arm in order to prevent the spring and the lower arm from coming into direct contact with each other, and to ensure performance in absorbing vibration and seating properties of the spring.

However, because the lower pad is made of a rubber material, the lower pad may be undesirably lifted up from the lower arm by elastic force of the spring when the spring is elastically deformed, and then the lower pad may become separated from the lower arm.

The above information disclosed in this Background section is only for enhancement of understanding of the background of the inventive concept, and, therefore, it may contain information that does not form the prior art that is already known in this country to a person of ordinary skill in the art.

SUMMARY

An exemplary embodiment provides a suspension system for a vehicle, capable of preventing a lower pad from being separated from a lower arm by elastic force of a spring.

Additional aspects will be set forth in the detailed description which follows, and, in part, will be apparent from the disclosure, or may be learned by practice of the inventive concept.

An exemplary embodiment of the present invention discloses a suspension system for a vehicle, including: a spring configured to support a load of a vehicle body; a lower arm disposed at a lower side of the spring and configured to support the spring; and a lower pad disposed at an upper side of the lower arm and on which the spring is seated. The lower pad includes an elastically deformable part made of a material deformable by elastic force of the spring, and a base part made of a material harder than the material of the elastically deformable part, and coupled to the lower arm.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate an exemplary embodiment of the inventive concept, and, together with the description, serve to explain principles of the inventive concept.

DETAILED DESCRIPTION OF THE ILLUSTRATED EMBODIMENT

Figure 1:
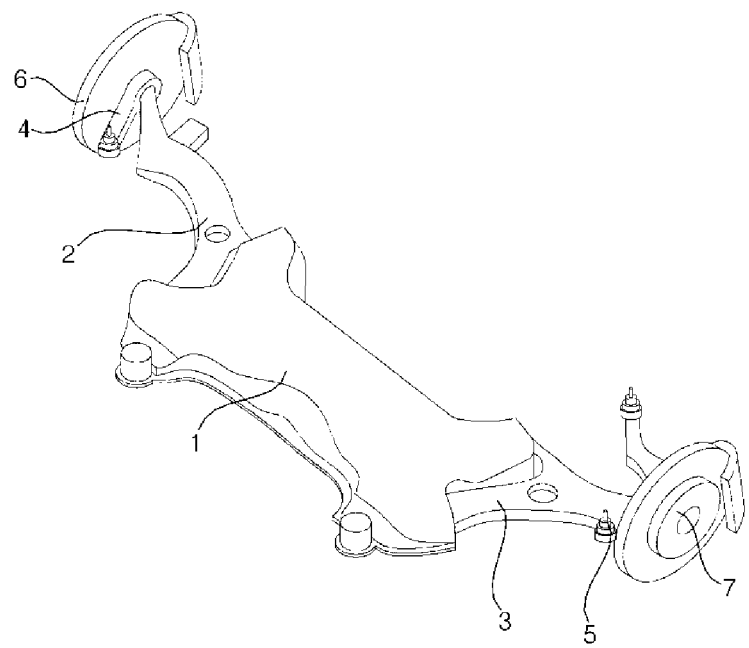
FIG. 1 is a view illustrating a state in which a lower arm of a suspension system for a vehicle according to an exemplary embodiment of the present invention is installed in a vehicle.

In the following description, for the purposes of explanation, numerous specific details are set forth in order to provide a thorough understanding of an exemplary embodiment. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of elements may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, and/or sections, these elements, components, and/or sections should not be limited by these terms. These terms are used to distinguish one element, component, and/or section from another element, component, and/or section. Thus, a first element, component, and/or section discussed below could be termed a second element, component, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view illustrating a state in which a lower arm of a suspension system for a vehicle according to an exemplary embodiment of the present invention is installed in a vehicle.

Referring to FIG. 1, a cross member 1 is installed at the rear side of the vehicle in which the suspension system for a vehicle according to the exemplary embodiment of the present invention is installed. The cross member 1 is disposed to be elongated in a left and right direction, and connected with axles 6 and 7 through lower arms 2 and 3 and link members 4 and 5.

The axles 6 and 7 include a left axle 6 which is disposed in a left wheel, and a right axle 7 which is disposed in a right wheel. The link members 4 and 5 include a left link member 4 connected to the left axle 6, and a right link member 5 connected to the right axle 7. While one left link member 4 and one right link member 5 are illustrated, a plurality of left link members 4 and a plurality of right link members 5 may be provided. The lower arms 2 and 3 include a left lower arm 2 coupled to the cross member 1 and the left link member 4, and a right lower arm 3 coupled to the cross member 1 and the right link member 5. One end of the left lower arm 2 is coupled to the left side of the cross member 1, and the other end of left lower arm 2 is coupled to the left link member 4. One end of the right lower arm 3 is coupled to the right side of the cross member 1, and the other end of the right lower arm 3 is coupled to the right link member 5.

A spring, which absorbs vibration in the vehicle body, is installed on the left lower arm 2, and a spring is also installed on the right lower arm 3. Hereinafter, for ease of description, only the left lower arm 2 will be described as the lower arm 2.

Figure 2:
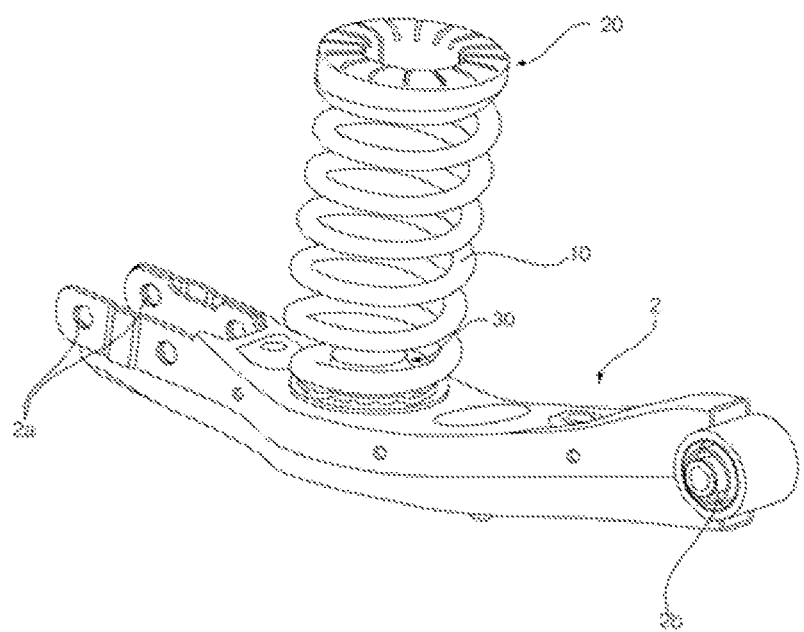
FIG. 2 is a view illustrating a state in which a spring is installed on the lower arm of the suspension system for a vehicle according to the exemplary embodiment of the present invention.

FIG. 2 is a view illustrating a state in which a spring is installed on the lower arm of the suspension system for a vehicle according to the exemplary embodiment of the present invention.

Referring to FIG. 2, the lower arm 2 is formed to have a hollow cross section that is roughly quadrangular. A fastening hole 2a, which is fastened to the cross member 1 by a bolt (not shown), is formed at the one end of the lower arm 2, and a fastening portion 2b to which the link member 4 is rotatably coupled is formed at the other end of the lower arm 2.

The spring 10 is installed at an upper side of the lower arm 2. The lower arm 2 is disposed at a lower side of the spring 10 and supports the spring 10. The spring 10 is formed in the form of a coil and disposed to be elongated in an up and down direction, and the spring 10 supports a load of the vehicle body. The spring 10 absorbs vibration by using elastic force that is generated while the spring 10 is compressed by vibration transmitted from a road surface, thereby minimizing vibration transmitted to the vehicle body.

An upper pad 20, which is connected with the vehicle body, is coupled to an upper end of the spring 10. Further, a lower pad 30, on which a lower end of the spring 10 is seated, is coupled to the upper side of the lower arm 2.

The lower pad 30 has the following functions.

First, the lower pad 30 absorbs vibration while being deformed by elastic force of the spring 10.

Second, the lower pad 30 should not be separated from the lower arm 2 even though when the lower pad 30 is deformed by elastic force of the spring 10.

The lower pad 2 of the suspension system for a vehicle according to the exemplary embodiment of the present invention is made of two types of materials so as to have the aforementioned functions. That is, a part of the lower pad 2 is made of a material that may be deformed by elastic force of the spring 10, and the remaining part of the lower pad 2 is made of a material that is not deformed by elastic force of the spring 10, and may be securely coupled to the lower arm 2. This configuration will be described below with reference to FIGS. 3 to 5.

Figure 3A:
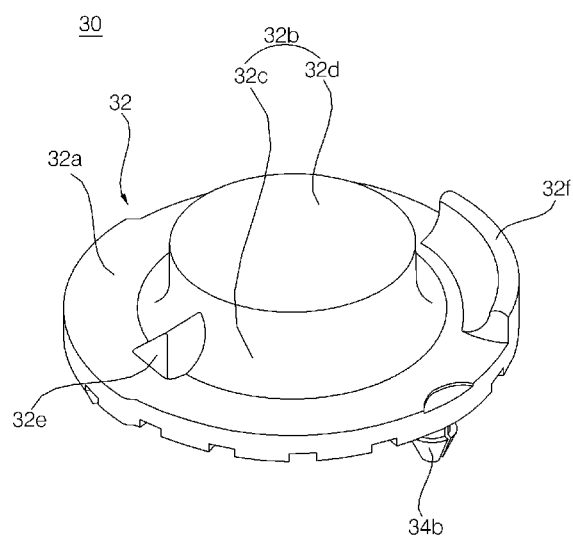
FIG. 3($a$) and FIG. 3($b$) respectively illustrate a front perspective view and a rear perspective view of a lower pad of the suspension system for a vehicle according to the exemplary embodiment of the present invention.
Figure 3B:
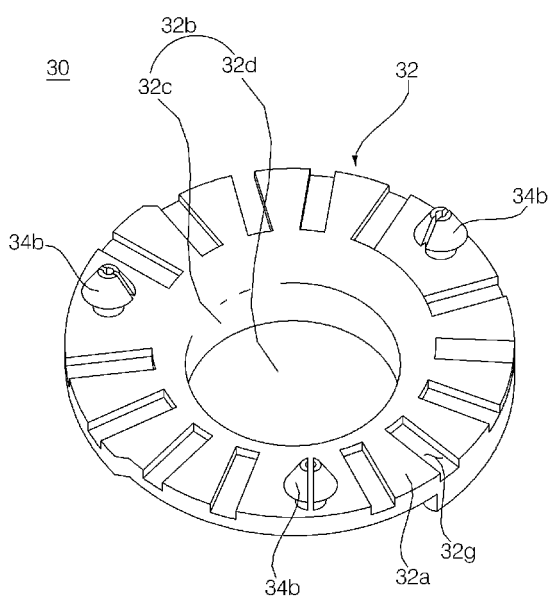
Figure 4:
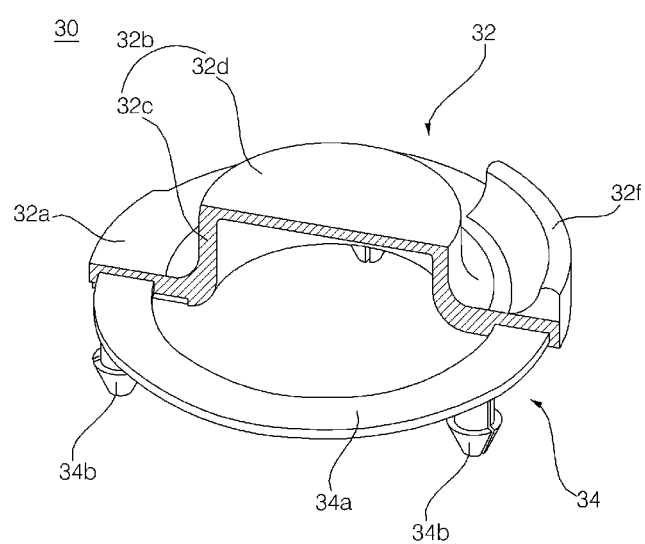
FIG. 4 is a cut-away perspective view illustrating the lower pad of the suspension system for a vehicle according to the exemplary embodiment of the present invention.
Figure 5A:
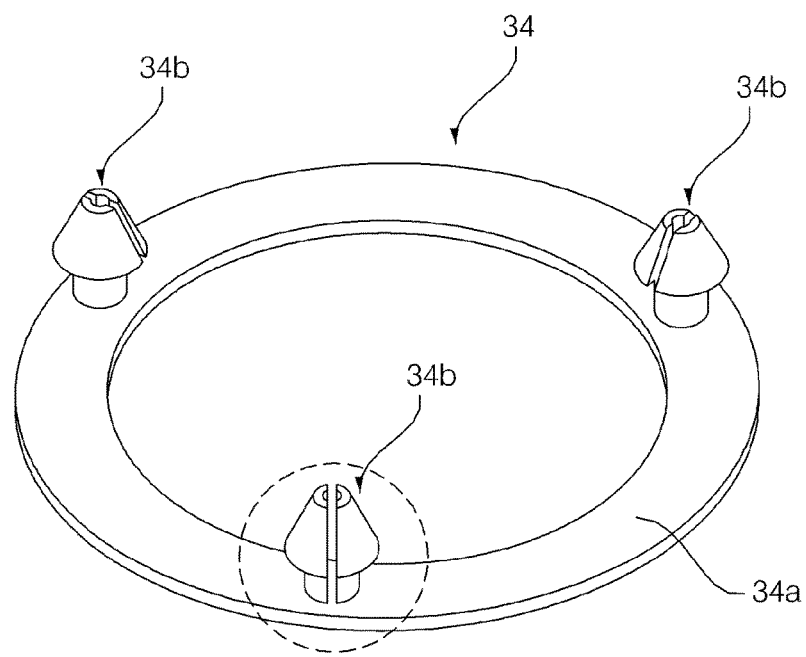
FIGS. 5($a$) and 5($b$) are views illustrating a base part illustrated in FIG. 4, where FIG. 5($b$) is an enlarged view of a portion of FIG. 5($a$).

FIGS. 3($a$) and 3($b$) respectively illustrate front and rear perspective views of a lower pad of the suspension system for a vehicle according to the exemplary embodiment of the present invention, FIG. 4 is a cut-away perspective view illustrating the lower pad of the suspension system for a vehicle according to the exemplary embodiment of the present invention, and FIG. 5 is a view illustrating a base part illustrated in FIG. 4.

Referring to FIGS. 3($a$), 3($b$), 4, 5($a$), and 5($b$), the lower pad 30 includes an elastically deformable part 32 made of a material deformable by elastic force of the spring 10, and a base part 34 made of a material harder than the material of the elastically deformable part 32, and coupled to the lower arm 2. In the present exemplary embodiment, the elastically deformable part 32 may be made of rubber, and the base part 34 may be made of engineering plastic that is harder than the rubber of the elastically deformable part 32.

The elastically deformable part 32 and the base part 34 are integrally formed. The base part 34 is formed first; the completely formed base part 34 is then inserted into a mold; and then rubber, which will become the elastically deformable part 34, is injected into the mold, such that the elastically deformable part 32 and the base part 34 may be integrally formed in the mold.

The elastically deformable part 32 includes a spring seating portion 32a on which the spring 10 is seated, and a spring insertion portion 32b which protrudes upward inside the spring seating portion 32a and is insertable into the spring 10.

An anti-rotation protrusion 32e, which may come into contact with the lower end of the spring 10 to prevent rotation of the spring 10, and an anti-withdrawal protrusion 32f, which may come into contact with a side surface of the spring 10 to prevent withdrawal of the spring 10, are formed on the spring seating portion 32a. That is, when the spring 10 is compressed, the spring 10 may be compressed without being rotated by the anti-rotation protrusion 32e, and is not withdrawn radially outward from the spring seating portion 32a by the anti-withdrawal protrusion 32f.

The anti-rotation protrusion 32e protrudes at an upper side of the spring seating portion 32a and extends from the spring insertion portion 32b, and the anti-withdrawal protrusion 32f protrudes at the upper side of the spring seating portion 32a and extends from an outer circumferential surface of the spring seating portion 32a.

A circumferential surface 32c of the spring insertion portion 32b extends straight upward inside the spring seating portion 32a, and an upper surface 32d of the spring insertion portion 32b extends at an upper end of the circumferential surface 32c to be orthogonal to the circumferential surface 32c, and is formed to be flat. Therefore, a vacant space is present in the spring insertion portion 32b.

A plurality of grooves 32g are formed in a circumferential direction in a lower surface of the spring seating portion 32a, which is in contact with the lower arm 2. The grooves 32g are formed to be recessed upward in the lower surface of the spring seating portion 32a. By virtue of the plurality of grooves 32g, the elastically deformable part 32 may be easily deformed by elastic force of the spring 10, and may absorb vibration.

The base part 34 includes a body portion 34a, which is coupled to the spring seating portion 32a of the elastically deformable part 32, and assembling protruding portions 34b, which protrude from the body portion 34a and are coupled to the lower arm 2. The body portion 34a is formed in an annular shape, and three assembling protruding portions 34b are formed to be spaced apart from each other at equal intervals in a circumferential direction of the body portion 34a.

The body portion 34a is disposed inside the spring seating portion 32a of the elastically deformable part 32, such that the lower surface of the spring seating portion 32a may be in contact with the upper surface of the lower arm 2.

The assembling protruding portions 34b protrude downward from the lower surface of the body portion 34a. Because the body portion 34a is disposed inside the spring seating portion 32a of the elastically deformable part 32, the assembling protruding portions 34b penetrate the spring seating portion 32a, and then protrude downward from the elastically deformable part 32.

The assembling protruding portions 34b may be inserted into holes (not illustrated) formed in the upper surface of the lower arm 2, and coupled to the lower arm 2.

Figure 5B:
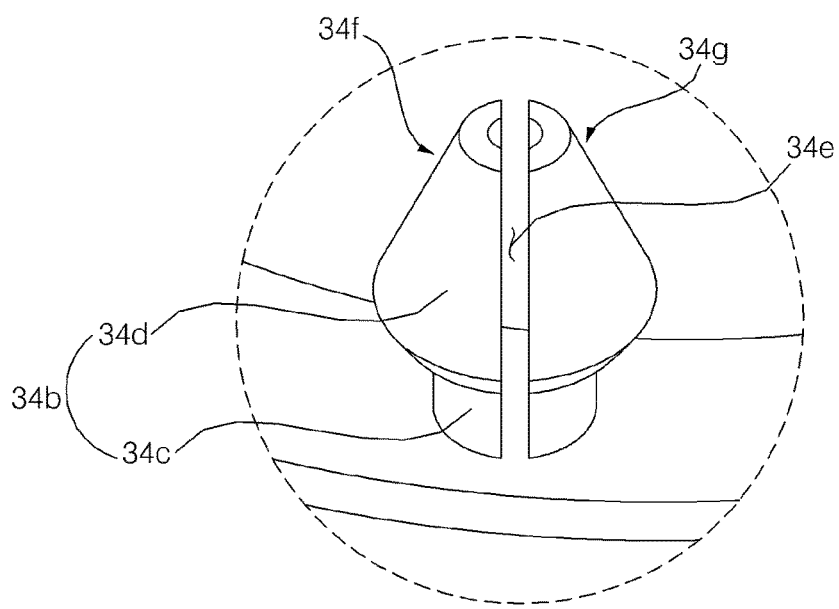

Each assembling protruding portion 34b includes an extending portion 34c, which extends from the body portion 34a and is disposed at a lower side of the body portion 34a, and a conical portion 34d, which extends from the extending portion 34c and is disposed at a lower side of the extending portion 34c, as shown in FIG. 5(b). In a state in which the assembling protruding portion 34b is coupled to the lower arm 2, the extending portion 34c is positioned in the hole formed in the upper surface of the lower arm 2, and the conical portion 34d is caught by the lower arm 2 at a lower side of the hole.

The extending portion 34c has a constant diameter from an upper end to a lower end of the extending portion 34c. An upper end of the conical portion 34d has a larger diameter than the extending portion 34c, and a diameter of the conical portion 34d is gradually decreased toward the lower end of the conical portion 34d. In a state in which the assembling protruding portion 34b is coupled to the lower arm 2, an upper surface of the conical portion 34d may come into contact with the lower arm 2 and may be caught by the lower arm 2.

A cut-out portion 34e, which is cut out from a lower end toward an upper end of the assembling protruding portion 34b, is formed in the assembling protruding portion 34b. When the assembling protruding portion 34b is inserted into the hole formed in the lower arm 2 so as to be coupled to the lower arm 2, the cut-out portion 34e allows the assembling protruding portion 34b to be retracted inward, and after the assembling protruding portion 34b is completely inserted into the hole, the cut-out portion 34e allows the assembling protruding portion 34b to be restored back to an original position by elastic force.

The cut-out portion 34e may be formed in a partial section of the assembling protruding portion 34b in a direction from the lower end to the upper end of the assembling protruding portion 34b, but in the present exemplary embodiment, the cut-out portion 34e is formed from the lower end to the upper end of the assembling protruding portion 34b. Therefore, the cut-out portion 34e divides the assembling protruding portion 34b into two pieces.

That is, the assembling protruding portion 34b includes a first projection 34f which protrudes from the body portion 34a, and a second projection 34g which protrudes from the body portion 34a so as to be spaced apart from the first projection 34f. The first projection 34f and the second projection 34g are formed to have the same shape.

As described above, according to the suspension system for a vehicle according to the exemplary embodiment of the present invention, since the lower pad 30 includes the elastically deformable part 32 which is made of a material deformable by elastic force of the spring 10, and the base part 34 which is made of a material harder than the material of the elastically deformable part 32, and coupled to the lower arm 2, the lower pad 30 may be securely coupled to the lower arm 2 through the base part 34 while maintaining the vibration absorbing function of the spring 10 through the elastically deformable part 32.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A suspension system for a vehicle, comprising:
a spring configured to support a load of a vehicle body;

a lower arm disposed at a lower side of the spring and configured to support the spring; and a lower pad disposed at an upper side of the lower arm and on which the spring is seated, wherein the lower pad comprises:

an elastically deformable part comprising a material deformable by elastic force of the spring; and a base part made of a material harder than the material of the elastically deformable part, and coupled to the lower arm, the base part comprising:

a body portion coupled to and disposed inside the elastically deformable part; and an assembling protruding portion protruding from the body portion and configured to penetrate the elastically deformable part to be coupled with the lower arm.

2. The suspension system of claim 1, wherein the elastically deformable part and the base part are integrally formed.

3. The suspension system of claim 1, wherein the elastically deformable part comprises:

a spring seating portion on which the spring is seated; and a spring insertion portion configured to protrude upward inside the spring seating portion and configured to be insertable into the spring.

4. The suspension system of claim 3, wherein an anti-rotation protrusion, which is configured to come into contact with a lower end of the spring and prevent rotation of the spring, and an anti-withdrawal protrusion, which is configured to come into contact with a side surface of the spring and prevent withdrawal of the spring, are formed on the spring seating portion.

5. The suspension system of claim 4, wherein:

the anti-rotation protrusion protrudes at an upper side of the spring seating portion and extends from the spring insertion portion; and the anti-withdrawal protrusion protrudes at the upper side of the spring seating portion and extends from an outer circumferential surface of the spring seating portion.

6. The suspension system of claim 1, wherein the body portion has an annular shape.

7. The suspension system of claim 1, wherein the assembling protruding portion comprises:

an extending portion extending from the body portion and having a constant diameter from an upper end to a lower end of the extending portion; and a conical portion extending from the extending portion, the conical portion comprising an upper end having a diameter greater than a diameter of the extending portion, and having a diameter that is gradually decreased toward the lower end of the conical portion.

8. The suspension system of claim 1, wherein the assembling protruding portion comprises a cut-out portion, which is cut out from a lower end toward an upper end of the assembling protruding portion.

9. The suspension system of claim 1, wherein the assembling protruding portion comprises:

a first projection protruding from the body portion; and a second projection protruding from the body portion so as to be spaced apart from the first projection.

* * * * *